C. F. JENKINS.
MOTION PICTURE APPARATUS.
APPLICATION FILED JULY 20, 1911.
1,163,757.
Patented Dec. 14, 1915.
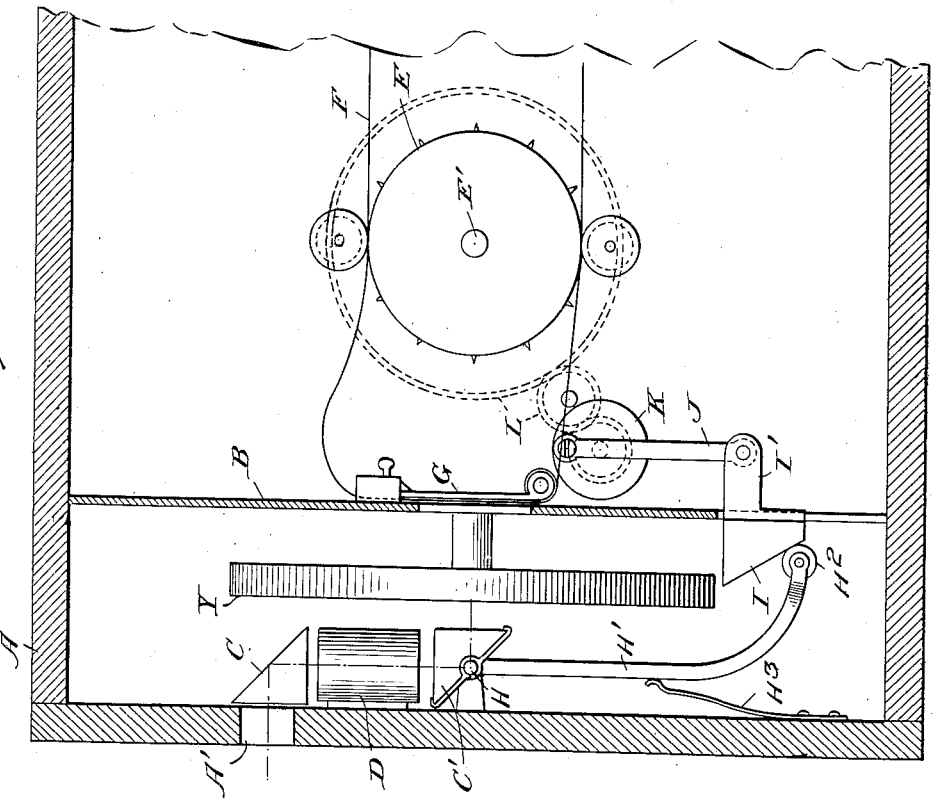
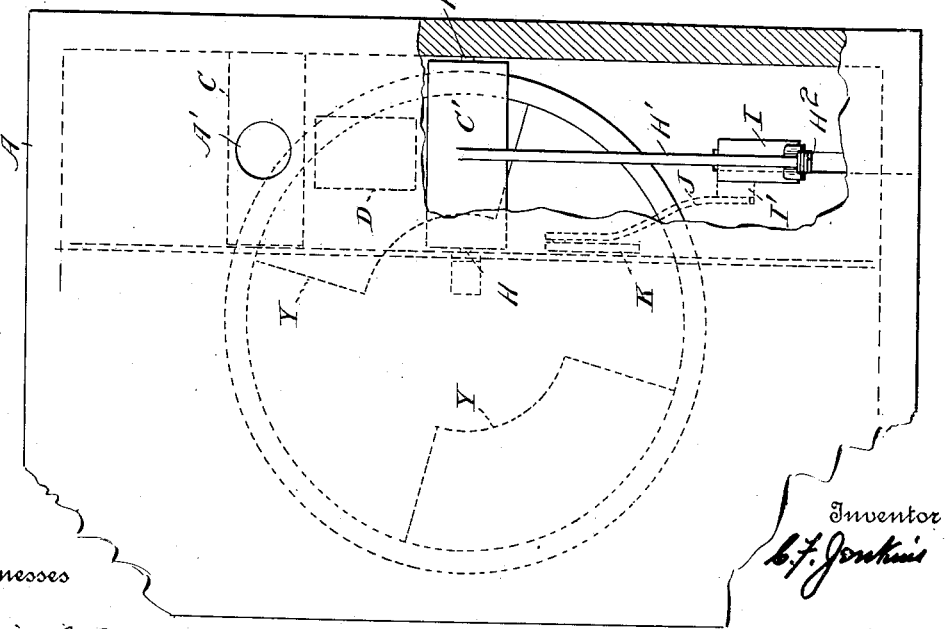

UNITED STATES PATENT OFFICE.

CHARLES FRANCIS JENKINS, OF WASHINGTON, DISTRICT OF COLUMBIA.

MOTION-PICTURE APPARATUS.

1,163,757.   Specification of Letters Patent.   Patented Dec. 14, 1915.

Application filed July 20, 1911.  Serial No. 639,593.

*To all whom it may concern:*

Be it known that I, CHARLES FRANCIS JENKINS, a citizen of the United States, residing at Washington, District of Columbia, have invented certain new and useful Improvements in Motion-Picture Apparatus, of which the following is a specification, reference being had therein to the accompanying drawing.

In motion picture cameras and the like perfect accuracy in locating each picture upon the film is desirable and many expedients have been employed to attain approximately this end. As many exposures are necessarily made in a second, motions of heavy parts in non-circular paths, often, if not always, cause inaccuracy, rapid wear and objectionable noise.

Good results have been obtained by lenses traveling in a circular path, alongside and at the same rate as the film, during the exposure intervals, and also by using a reciprocating lens which engages and itself carries the film during the exposure intervals and thus avoids failure to obtain perfect coincidence of lens and film movement. Both these expedients as well as the more common one of stopping the film before a fixed lens during exposure involve disadvantages, which it is the principal object of this invention to avoid.

In the apparatus hereinafter set forth, the lens is fixed but the light rays therefrom are made to follow a constantly moving film, during the exposure interval, by means of a deflector, sudden and violent strains upon the film are thus entirely avoided, only parts having little inertia or momentum are moved in non-circular paths, and, whatever the rate of movement, practically little noise, vibration, or strain is caused, while accuracy in position of the pictures on the film is very nearly perfect.

In the accompanying drawings, Figure 1 is a front elevation of mechanism constituting one embodiment of the invention. Fig. 2 is a view looking from the right in Fig. 1.

In these figures, A represents a portion of the camera casing having a light opening at A', B a partition dividing the interior space and provided with the usual exposure opening, C a deflector, here shown as a common triangular prism, to receive light from the opening A' and reflect it to the lens D, C' a deflector, shown in this instance as a similar prism, to receive the light from the lens and normally change its course precisely ninety degrees throwing it rearward toward the partition B.

E is a film sprocket drum carried by a constantly rotating shaft E' and at its upper side constantly feeding film F to a film guide G upon the partition B at the exposure opening, no novelty being found in the location or function of the guide. The lower side of the drum engages the film after exposure at the guide and feeds it toward any suitable place of storage. Between the exposure opening and the lens is a rotary shutter Y actuated from the drum shaft and adapted to allow light to pass from the prism C' to the film at proper intervals only. Because the film is not at rest during exposure, the prism C' is pivoted and so rocked that the image which it directs to the film remains in precisely the same place upon the latter until the shutter cuts off the light, when the prism is rocked back to initial position. To secure this slight rocking of the prism through exactly the proper angular distance at precisely the proper time and rate, the prism is pivoted at H and provided with an arm H' extending below the shutter and bearing at its free end a small roller $H^2$ which a spring $H^3$ holds against a member or cam I mounted upon the partition B to reciprocate vertically. This cam has an arm I' extending through a slot in the partition B and connected by a pitman J to a crank plate K rotated from the drum shaft by gears L. The parts are so proportioned and the inclination of the cam face is such that when the shutter allows the image from the lens to fall upon the exposed film that image is moved downward, by the rocking of the prism, at precisely the same rate at which the film advances; and when the shutter cuts off the light the cam again rises and the spring rocks the cam back to its original position. The movement of the prism is slight, the force required hardly appreciable, and hence the spring, cam and pitman are made so light as to have very small inertia and momentum. It follows that the machine is nearly noiseless and without material vibration, and the steadiness of the film and accuracy of the pictures, in position, is unusual.

It may be noted, further, that since there is no step by step movement of the film there is no need for the usual slack, above the point of exposure, at least equal to the distance from center to center of consecutive pictures, nor is there any material strain upon the film as there is necessarily in all step by step machines. Obviously the invention is not limited to any particular means for rocking the deflector and securing its restoration to initial position during the indicated fixed portion of the interval between its forward movements, nor to the illustrated position of the lens with a normal or primary deflection of ninety degrees.

What I claim is:

The combination with a casing having a wall provided with an exposure aperture, of means for continuously advancing a film strip across said aperture, a fixed lens having its axis parallel to said wall, a fixed reflector for throwing a light beam through said lens, a second reflector for throwing the beam coming from the lens through said aperture, and a reciprocating cam arranged to rock the second reflector and keep the light beam therefrom in constant position upon the film during the exposure of the latter.

In testimony whereof I have affixed my signature in presence of two witnesses.

CHARLES FRANCIS JENKINS.

Witnesses:
 JAMES L. CRAWFORD,
 ROBERT CRAIG GREENE.